United States Patent [19]
Röhm

[11] Patent Number: 5,158,306
[45] Date of Patent: Oct. 27, 1992

[54] DRILL CHUCK

[76] Inventor: Günter H. Röhm, Heinrich-Röhm-Strasse 50, D-7927 Sontheim, Fed. Rep. of Germany

[21] Appl. No.: 733,712

[22] Filed: Jul. 22, 1991

[30] Foreign Application Priority Data

Jul. 21, 1990 [DE] Fed. Rep. of Germany ....... 4023304

[51] Int. Cl.5 ............................................. B23B 31/16
[52] U.S. Cl. ....................................... 279/61; 279/902
[58] Field of Search ................................... 279/60-62, 279/117, 19, 19.3, 19.4; 173/48

[56] References Cited

U.S. PATENT DOCUMENTS

| 4,213,622 | 7/1980 | Rohm | 279/60 |
| 4,214,765 | 7/1980 | Rohm | 279/62 X |
| 4,272,087 | 6/1981 | Rohm | 279/62 |
| 4,619,461 | 10/1986 | Rohm | 173/48 X |
| 4,621,820 | 11/1986 | Rohm | 173/48 X |
| 4,627,626 | 12/1986 | Rohm | 279/19.3 X |
| 4,627,627 | 12/1986 | Rohm | 279/19.3 X |
| 4,627,628 | 12/1986 | Rohm | 279/19.3 X |
| 4,700,956 | 10/1987 | Rohm | 173/48 X |
| 4,702,485 | 10/1987 | Rohm | 173/48 X |
| 4,703,942 | 11/1987 | Rohm | 173/48 X |
| 4,844,482 | 7/1989 | Rohm | 279/19.4 X |

FOREIGN PATENT DOCUMENTS

| 142608 | 5/1985 | European Pat. Off. | 279/1 H |
| 3425736 | 1/1986 | Fed. Rep. of Germany | 279/19 |
| 3443186 | 5/1986 | Fed. Rep. of Germany | 279/62 |
| 3515259 | 8/1986 | Fed. Rep. of Germany | 279/19 |
| 3809316 | 5/1989 | Fed. Rep. of Germany |  |
| 2606691 | 3/1988 | France |  |
| 705764 | 3/1954 | United Kingdom | 279/65 |
| 1566855 | 5/1980 | United Kingdom | 279/60 |
| 214940 | 5/1985 | United Kingdom | 279/19 |

Primary Examiner—Larry I. Schwartz
Assistant Examiner—Robert Schultz
Attorney, Agent, or Firm—Herbert Dubno; Andrew Wilford

[57] ABSTRACT

A drill chuck according to this invention has a chuck body centered on and normally rotatable about a chuck axis and formed centered on the axis with a plurality of angled guide passages each having an axially forwardly open front end and an axially rearwardly and radially outwardly open rear end, respective jaws displaceable in the guides, projecting from the front ends thereof, and formed with teeth exposed at the respective guide-passage rear ends, and an adjustment sleeve axially fixed on the body and rotatable thereon and formed with an internal screwthread meshing with the teeth of the jaws so that rotation of the sleeve in one direction advances the jaws and opposite rotation retracts them. A grip ring on the chuck body centered on the axis axially forward of the adjustment sleeve has an exposed outer surface provided with grip-enhancing formations. Formations on the body and on the grip ring axially and rotationally fix the grip ring on the chuck body.

8 Claims, 2 Drawing Sheets

DRILL CHUCK

FIELD OF THE INVENTION

The present invention relates to a drill chuck. More particularly this invention concerns such a chuck that is specifically intended to be adjusted by hand.

BACKGROUND OF THE INVENTION

A standard drill chuck has a chuck body centered on and normally rotatable about a chuck axis and formed centered on the axis with a plurality of angled guide passages each having an axially forwardly open front end and an axially rearwardly and radially outwardly open rear end. Respective jaws displaceable in the guides project from the front ends thereof and are formed with teeth exposed at the respective guide-passage rear end. An adjustment sleeve axially fixed on the body and rotatable thereon is formed with a internal screwthread meshing with the teeth of the jaws. Thus rotation of the sleeve in one direction advances the jaws and opposite rotation retracts them.

Such a chuck is described in German patent 3,809,316. The adjustment sleeve extends substantially the full length of the chuck. Thus the torque of any adjustment must be taken up by the drill spindle. Alternately the chuck body can be extended rearward of the adjustment sleeve to give the user some place to grab the chuck with one hand while the other hand rotates the adjustment sleeve, in which case the chuck is fairly long.

OBJECTS OF THE INVENTION

It is therefore an object of the present invention to provide an improved drill chuck.

Another object is the provision of such an improved drill chuck which overcomes the above-given disadvantages, that is which is easy to adjust with two hands yet which is axially relatively compact.

SUMMARY OF THE INVENTION

A drill chuck according to this invention has a chuck body centered on and normally rotatable about a chuck axis and formed centered on the axis with a plurality of angled guide passages each having an axially forwardly open front end and an axially rearwardly and radially outwardly open rear end, respective jaws displaceable in the guides, projecting from the front ends thereof, and formed with teeth exposed at the respective guide-passage rear ends, and an adjustment sleeve axially fixed on the body and rotatable thereon and formed with an internal screwthread meshing with the teeth of the jaws so that rotation of the sleeve in one direction advances the jaws and opposite rotation retracts them. In accordance with this invention a grip ring on the chuck body centered on the axis axially forward of the adjustment sleeve has an exposed outer surface provided with grip-enhancing formations. Formations on the body and on the grip ring axially and rotationally fix the grip ring on the chuck body.

Thus with this arrangement the user can hold the grip ring with one hand while rotating the adjustment sleeve with the other. The grip ring is provided forward of the adjustment sleeve, in a location which must be somewhat elongated to provide for the necessary travel of the chuck jaws. It is a fairly easy variation to provide forwardly directed teeth on the front edge of the adjustment sleeve and a radially outwardly open hole on the grip ring to accommodate a standard chuck key.

According to another feature of this invention the sleeve has an outer surface of substantially the same outside diameter as the outer surface of the grip ring. In addition the sleeve has an axially forward edge and the grip ring has immediately thereadjacent an axially backward edge and these edges are formed with axially and radially overlapping lips.

The formations according to the invention include an abutment carried on the chuck body immediately axially forward of the grip ring. Furthermore the grip ring has forward of its outer surface a frustoconical and forwardly tapered forward surface portion. More specifically the formations are an axially rearwardly and radially inwardly open pocket formed in the grip ring, a radial outward projection provided on the chuck body and engaged radially in the pocket, and a snap ring set in the chuck body axially immediately forward of the grip ring. Removal of the snap ring makes it extremely easy to disassemble the chuck by pulling the grip ring forward off it, and then pulling the adjustment sleeve forward off the chuck body also.

Means is also provided in accordance with this invention for preventing unintentional loosening of the chuck. These means include a plurality of forwardly directed latching formations on the adjustment sleeve, a locking element axially displaceable on the grip ring between a rear position engaged with the latching formations and inhibiting relative rotation of the sleeve and grip ring and a front position permitting such relative rotation, and a spring braced between the locking element and the grip ring and urging the grip ring into the rear position.

The latching formations are axially forwardly directed teeth with inclined side surfaces and the locking element has an axially rearwardly projecting head with generally complementary inclined side surfaces so that forcible relative rotation of the grip ring and sleeve can cam the locking element out from between the sleeve teeth. The grip ring is provided with a plurality of such locking elements and springs spaced angularly about the axis. Furthermore at least some of the locking elements are set at an angular spacing about the axis that is equal to the sum of a whole-number multiple of the angular spacing between adjacent teeth of the sleeve and a difference angle that is equal to the angular spacing between adjacent teeth of the sleeve divided by the number of locking elements. Thus the spacing of the teeth and of the locking elements is not identical so that at least one locking element will be in latching engagement with the sleeve teeth in virtually any angular position of the grip ring.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
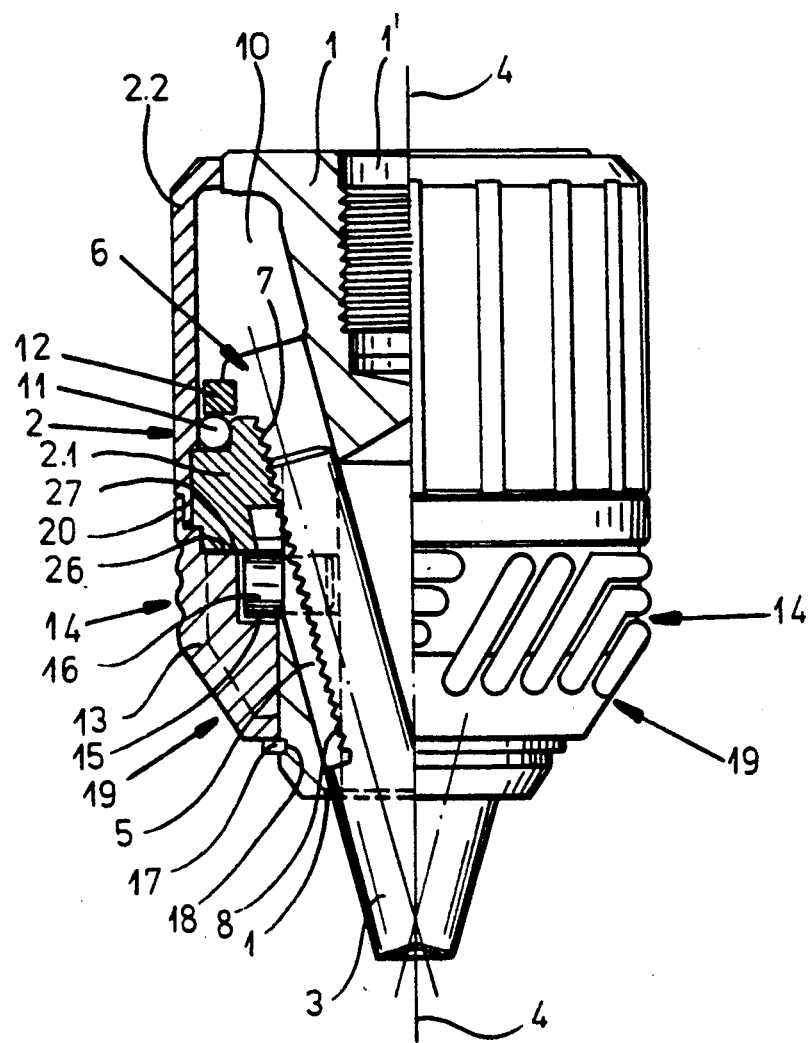
FIG. 1 is a side view partly in axial section through a chuck according to the invention.

As seen in FIG. 1 a drill chuck has a chuck body 1 formed with a threaded bore 1' centered on an axis 4 for rotation of the chuck body 1 about this axis 4. An adjustment sleeve 2 is axially but not rotationally fixed to the body 1 and coaxially surrounds it. The body 1 is formed with three angularly equispaced guide bores 5 each holding a respective jaw 3 having a toothed outer edge 8. A frustoconical screwthread 7 formed on an inner ring part 2.1 of the sleeve 2 meshes with the teeth 8 to displace the jaws 3 axially forward and radially together on rotation of the sleeve 2 in one direction and opposite rotation oppositely displaces the jaws 3 in the matter well known per se.

The guide holes 5 open on the side of the body 1 at openings 6 into a space 10 defined by a mainly cylindrical outer part 2.2 of the sleeve 2, the parts 2.1 and 2.2 being fixed integrally together. The ring 2.1 bears backward via bearing balls 11 on a ring 12 in turn seated on a forwardly directed shoulder of the body 1 so that the sleeve 2 can rotated freely on the body 1 without moving axially backward thereon.

A grab ring 13 having a frustoconically tapered front end 19 and a cylindrical rear end 14 of the same outside diameter as the sleeve part 2.2 but provided with grip-enhancing formations lies axially immediately ahead of the sleeve 2. This ring 13 is formed with an axially backwardly open pocket 15 that fits over a radially projecting bolt 16 fixed in the body 1 to rotationally solidly couple the ring 13 with the body 1. The body 1 is formed immediately forward of the ring 13 with a radially outwardly open groove 18 into which fits a snap ring 17 serving as a forward abutment that retains the ring 13 on the body 1. The rear end of the ring 13 and the front ends of the outer sleeve part 2.2 are formed with axially overlapping lips 20 to prevent chips and dust from entering the space 10.

Thus the grab ring 13 is rotationally fixed to the body 1 by the interfit of the bolt 16 and pocket 15, its axial forward displacement is limited by the abutment ring 17, and its axially backward displacement is limited by engagement of a rearwardly directed surface 26 that rides on a forwardly directed surface 27 of the ring 2.1 that itself is prevented from moving backward by the bearing 11 and ring 12.

Figure 2:
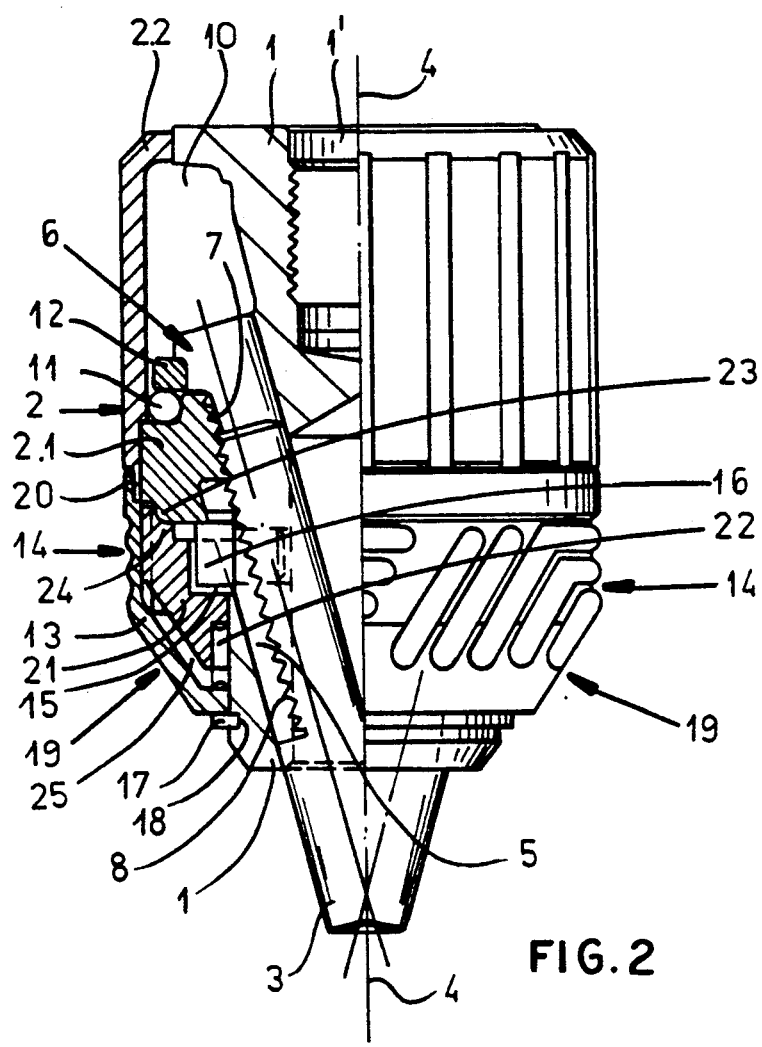
FIG. 2 is a view like FIG. 1 of a variant on the chuck.
Figure 3:
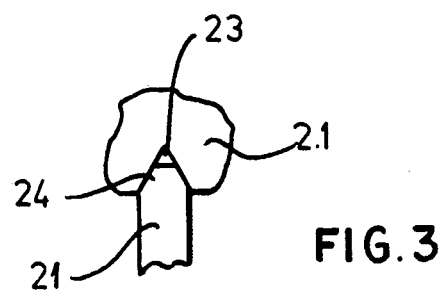
FIG. 3 is a side view of a detail of FIG. 2.

In the arrangement of FIG. 2 loosening of the chuck from vibration is prevented by a plurality of lock elements 21 carried in axially rearwardly open pockets 25 in the ring 13 and urged axially backward therein by respective compression springs 22. As seen in FIG. 3 these elements 21 have at their axially rear ends heads 24 that can engage between axially forwardly directed teeth 23 formed on the inner adjustment-sleeve part 2.1. The teeth 23 and head 24 have inclined side surfaces and the springs 22 are relatively weak so that if the sleeve 2 is forcibly rotated, the lock elements 21 will be cammed forward to permit adjustment of the chuck. The purpose of these elements 21 is merely to prevent casual loosening of the chuck; they do not prevent the chuck from being adjusted by hand or with a chuck key.

I claim:

1. A drill chuck comprising:
  a chuck body centered on and normally rotatable about a chuck axis and formed centered on the axis with a plurality of angled guide passages each having an axially forwardly open front end and an axially rearwardly and radially outwardly open rear end;
  a radial outward projection fixed on the chuck body;
  respective jaws displaceable in the guide passages, projecting from the front ends thereof, and formed with teeth exposed at the respective guide-passage rear ends;
  an adjustment sleeve axially fixed on the body and rotatable thereon, provided with a plurality of forwardly directed and angularly spaced latching formations, and formed with an internal screwthread meshing with the teeth of the jaws, whereby rotation of the sleeve in one direction advances the jaws and opposite rotation retracts them;
  a grip ring on the chuck body centered on the axis axially forward of the adjustment sleeve, formed with an axially rearwardly and radially inwardly open and radially outwardly closed pocket receiving the chuck-body projection, and having an exposed outer surface provided with grip-enhancing formations;
  a locking element axially displaceable but angularly fixed on the grip ring between a rear position engaged with the latching formations and inhibiting relative rotation of the sleeve and grip ring and a front position permitting such relative rotation; and
  a spring braced between the locking element and the grip ring and urging the grip ring into the rear position.

2. The drill chuck defined in claim 1 wherein the sleeve has an outer surface of substantially the same outside diameter as the outer surface of the grip ring.

3. The drill chuck defined in claim 1 wherein the sleeve has an axially forward edge and the grip ring has immediately thereadjacent an axially backward edge, the edges being formed with axially and radially overlapping lips.

4. The drill chuck defined in claim 1 further comprising
  an abutment carried on the chuck body immediately axially forward of the grip ring.

5. The drill chuck defined in claim 1 wherein the grip ring has forward of its outer surface a frustoconical and forwardly tapered forward surface portion.

6. The drill chuck defined in claim 1, further comprising
  a snap ring set in the chuck body axially immediately forward of the grip ring.

7. The drill chuck defined in claim 1 wherein the latching formations are axially forwardly directed teeth with inclined side surfaces and the locking element has an axially rearwardly projecting head with generally complementary inclined side surfaces, whereby forcible relative rotation of the grip ring and sleeve can cam the locking element out from between the sleeve teeth.

8. The drill chuck defined in claim 1 wherein the grip ring is provided with a plurality of such locking elements and springs spaced angularly about the axis.

* * * * *